United States Patent [19]

Will et al.

[11] Patent Number: 5,284,122
[45] Date of Patent: Feb. 8, 1994

[54] ANTI-ICING HEATER FOR AN ENGINE CARBURETOR

[75] Inventors: Lawrence N. Will, Plymouth; James L. King, Sheboygan, both of Wis.

[73] Assignee: Kohler Co., Kohler, Wis.

[21] Appl. No.: 27,299

[22] Filed: Mar. 4, 1993

[51] Int. Cl.$^5$ .............................................. F02M 23/14
[52] U.S. Cl. .................................. 123/549; 123/556; 261/142; 261/DIG. 20
[58] Field of Search ............... 123/556, 552, 549, 547, 123/545, 572, 573, 574; 261/142, DIG. 20

[56] References Cited

U.S. PATENT DOCUMENTS

| | | | |
|---|---|---|---|
| 2,766,974 | 10/1956 | McConnell | 261/152 |
| 2,877,753 | 3/1956 | Larsen . | |
| 3,085,558 | 4/1963 | Sarto | 123/556 |
| 3,128,321 | 4/1969 | Hammerschmidt | 261/142 |
| 3,787,037 | 1/1974 | Motooka | 123/549 |
| 4,020,815 | 3/1977 | Hubert | 123/142.5 R |
| 4,029,065 | 6/1977 | Wood . | |
| 4,177,778 | 12/1979 | Naitou et al. | 123/556 |
| 4,302,407 | 11/1981 | Hartel et al. | 261/130 |
| 4,316,442 | 2/1982 | McGinnis | 123/546 |
| 4,512,322 | 4/1985 | Barcy | 261/142 |
| 4,665,880 | 5/1987 | McWade | 123/556 |
| 4,685,437 | 8/1987 | Tanaka et al. | 123/549 |
| 4,816,192 | 3/1989 | Abou-Aly et al. | 261/130 |
| 4,922,882 | 5/1990 | Topfer | 123/556 |
| 5,040,517 | 8/1991 | Cox | 123/556 |
| 5,046,473 | 9/1991 | Hokenson | 123/556 |
| 5,076,247 | 12/1991 | Schmidt et al. | 123/556 |

Primary Examiner—Tony M. Argenbright
Assistant Examiner—M. Macy
Attorney, Agent, or Firm—Quarles & Brady

[57] ABSTRACT

An internal combustion engine has a carburetor for mixing fuel with air entering through an inlet. A heat exchanger is mounted onto the carburetor air inlet so that heat from the heat exchanger is conducted to the carburetor housing. The heat exchanger has a plurality of channels through which air from an air cleaner pass on the way to the carburetor. An electric heating device attached to said heat exchanger and a first thermostat controls the electric heating device to raise the temperature of the heat exchanger when the fuel-air mixture falls below a given temperature. A second thermostat senses the temperature of the heat exchanger and prevents the temperature from exceeding a level at which a user's skin will blister if the exchanger is touched accidentally. In cold operating environments, the heat exchanger assembly raises the temperature of the air above the dew point, thus effectively lowering the relative humidity. The carburetor also is heated so that water vapor in the air will not condense on the surfaces of the carburetor. This prevents accumulation of water which can freeze and affect the operation of the carburetor.

15 Claims, 3 Drawing Sheets

ANTI-ICING HEATER FOR AN ENGINE CARBURETOR

BACKGROUND OF THE INVENTION

The present invention relates to naturally aspirated, internal combustion engines; and more particularly to anti-icing heaters for carburetors of such engines.

In near freezing atmospheric temperatures, the carburetor of an internal combustion engine is very vulnerable to the formation of ice in the throat of the carburetor, on the choke and throttle plates, and over the gasoline venturi orifices. This condition is referred to as "classic icing." In addition, if water is left standing around the choke or throttle plates, it may freeze when the engine is unused for a prolonged period of time in freezing atmospheric temperatures. In this case, the choke and throttle plates become stuck in a closed or near closed position and the engine will not start. The degree of classic icing in a carburetor throat during operation of the engine is dependent upon the amount of water vapor or the water content in the air. The freezing of water around the throttle plates, for example due to the engine's sitting unused overnight, is more susceptible to other sources of water, such as from the engine crank case vent tube required for emission control.

Several phenomena control the amount of ice build-up within the carburetor. The first phenomenon is decompression of intake air produced by the engine cylinder vacuum. Such decompression causes the intake air temperature to drop which may cause the air to go below the freezing point depending upon the ambient temperature intake, the amount of pressure reduction, and the flow rate of the air. The amount of pressure drop the air experiences can be controlled by the carburetor throat design and the throttle plate position.

An air intake temperature below freezing often causes the water vapor to condense and then freeze on a surface of the carburetion system which is also less than zero degrees Celsius. Another factor effecting ice build-up is residual water left in the carburetor throat from the previous operation. Such water can freeze the choke plate, throttle plate and cover the gasoline diffusion venturi nozzle.

A common solution to this problem in the use of the manually operated damper is a manifold heat exchanger that collects hot air off the exhaust manifold or the exhaust pipe of the engine. The collected hot air is directed by duct work into the carburetor. This mechanism has a winter and summer setting to prevent overheating of the gasoline in the carburetor during warm weather operation. The drawback of such a system is that the damper must be controlled manually depending upon the season of operation.

SUMMARY OF THE INVENTION

In order to minimize the potential of ice forming in an engine carburetor, a heater is mounted in thermal contact with the carburetor and has a heat exchanger positioned upstream in the air flow into the carburetor. This arrangement enables heat from the anti-icing heater to be conducted into the carburetor thereby maintaining its components at a temperature above the freezing point of water. In addition, the air flowing through the anti-icing heat exchanger is warmed above the dew point to effectively reduce the humidity. As the air flows through the carburetor, convection turbulence transfers heat from the air to components of the carburetor providing another heat transfer mechanism which warms the carburetor. A side benefit of a heated carburetor is the warming of gasoline within the bowl of the carburetor which aids in the vaporization and combustion of the gasoline.

The heat exchanger is fabricated of thermally conductive material with a plurality of channels therethrough. A mechanism is provided to attach the heat exchanger to the air inlet of the carburetor so that air entering the carburetor flows through the channels. This attachment also establishes good thermal contact between the heat exchanger and the carburetor. An electric heating device is attached to said heat exchanger. Preferably an electric resistance heating device is used and a thermostat is located in the outlet manifold for the carburetor to turn on the heating device when the fuel-air mixture in the manifold is below a given temperature. As a safety precaution a second thermostat can be mounted in the heat exchanger in close proximity to the heating device. The second thermostat turns off the heating device when the temperature of the heat exchanger exceeds a predefined level.

DESCRIPTION OF THE PRESENT INVENTION

Figure 1:
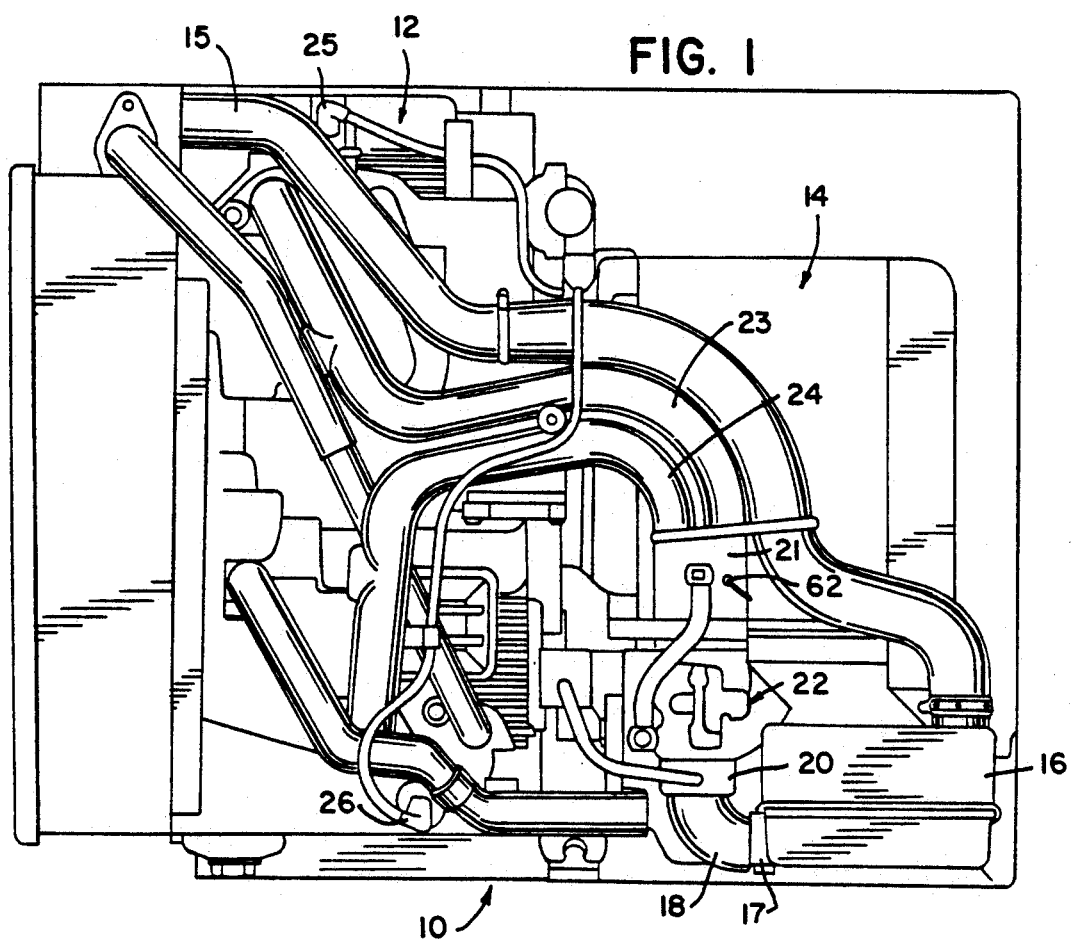
FIG. 1 is a plane view of an engine-generator set that incorporates the present carburetor air inlet heater.

FIG. 1 illustrates a top view of a gasoline engine-electrical generator set 10, such as the type commonly found in motor homes and recreational vehicles. This apparatus consists of the two cylinder gasoline engine 12 and an electric generator 14 which is driven by the engine. Combustion air enters through an inlet tube 15 and flows to an air cleaner 16 having an outlet 17. The air cleaner outlet 17 is connected by a curved tube 18 to an inlet air heater 20 that is attached to the air inlet on one side of a side-draft carburetor 22. Although the heater 20 is shown attached to a side-draft carburetor, the heater also can be used with up-draft and down-draft carburetors. The carburetor 22 receives gasoline from a tank (not shown) and mixes the fuel with the air flowing from the air cleaner 16. The fuel-air mixture passes from the carburetor 22 through manifold 21 and a pair of manifold tubes 23 and 24 which extend to the two engine cylinders. One cylinder is located beneath a first spark plug 25, while the other cylinder is located beneath the second spark plug 26.

The carburetor air inlet heater 20 serves two functions. The air passing through the heater between the air cleaner and the carburetor 22 is heated during cold temperatures so as to provide a more combustible mixture. The air also heats components of the carburetor 22 above the dew point so that water does not condense on the components. The heat causes the choke on the carburetor to return to a normal running position sooner, thus causing the engine to run smoother and creating less pollution. The heater 22 also contacts the inlet of the carburetor so that heat is conducted into the carburetor, further warming components of the carburetor. In addition to preventing ice build-up, the heat causes the choke on the carburetor to move to a normal running position sooner, thus causing the engine to run smoother and produce less pollution.

Figure 2:
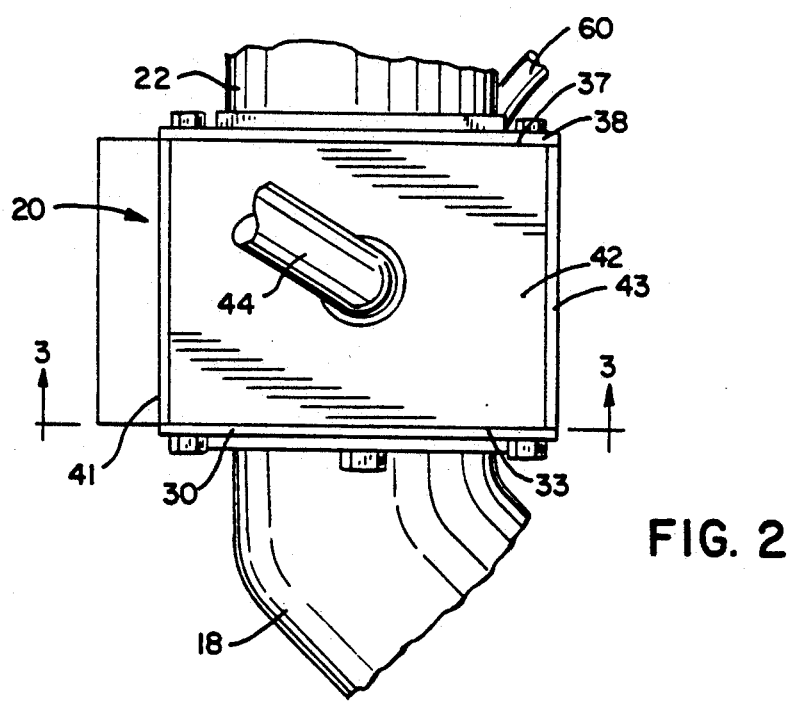
FIG. 2 is a top view of the carburetor air inlet heater.
Figure 3:
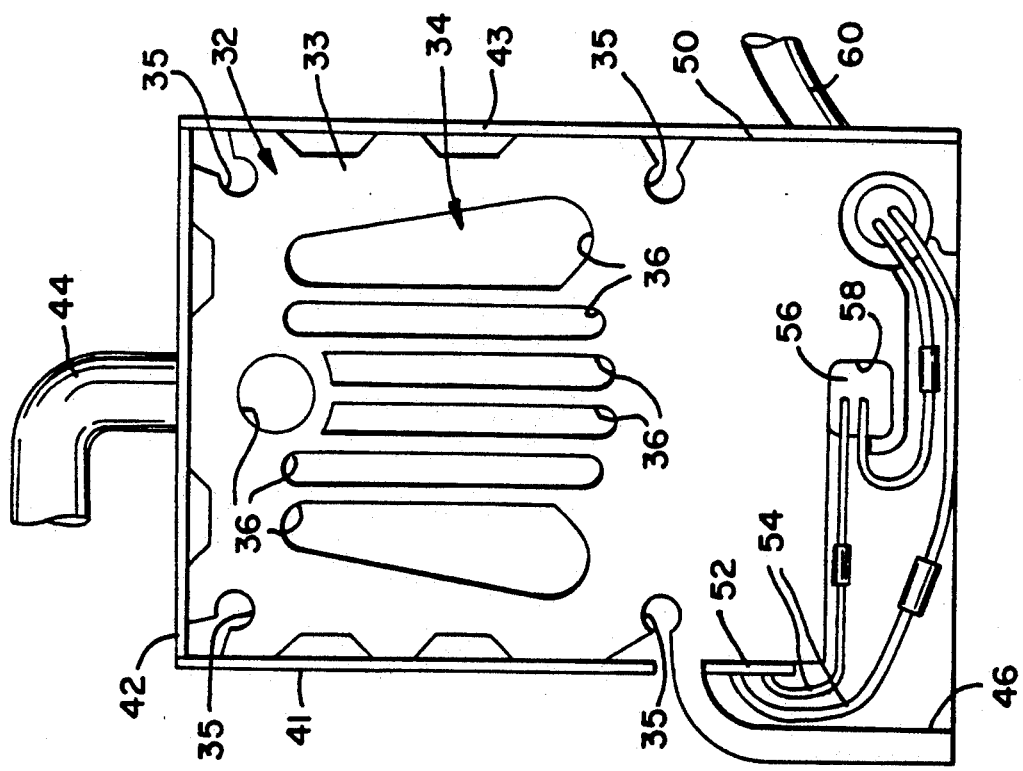
FIG. 3 is a plane view of the carburetor air inlet heater with the inlet plate removed.

FIGS. 2 and 3 illustrate the details of the carburetor inlet heater 20. The tube 18 from the air cleaner 16 connects to an adaptor plate 30 which is fastened by machine screws to one major surface 33 of a heat exchanger 32. The heat exchanger 32 is manufactured of cast or extruded aluminum and provides a closed conduit 34 which comprises seven separate channels 36 extending from the one surface 33 through the heat exchanger 32 to the opposite surface 37. An inlet plate 38 of the carburetor 32 is attached by machine screws to the opposite surface 37 of the heat exchanger 32. The heat exchanger 32 has four slots 35 which receive self-tapping machine screws to fasten the adaptor plate 30 and the carburetor inlet plate 38 to the heat exchanger 32.

Air flowing through the air cleaner tube 18 passes through the channels 36 and exits the opposite side of the heat exchanger 32 into the carburetor 22. Heat is transferred by convection from the walls of the channels 36 to the flowing air. Once the heated air enters the carburetor 22, heat is transferred from the air to the carburetor body, throttle and choke plates by convection turbulence. In addition, since the carburetor inlet heater 20 is fastened in direct contact to the carburetor 22, heat is conducted from the heat exchanger to the carburetor. This not only warms the carburetor above the freezing point of water, it also causes the gasoline in the bowl of the carburetor 22 to be warmed which aids in vaporization and combustion of the gasoline.

Three sheets 41, 42 and 43 of thermally insulating material are placed on three sides of the heat exchanger and snugly fit between the adaptor plate 30 and the carburetor inlet plate 38 so as to be held in place. The insulating sheets 41-43 protect against a user's fingers accidently touching a hot heat exchanger 32 as well as aid in retaining heat in the heat exchanger.

A crankcase vent tube 44 is pressed into an opening in the upper surface of the heat exchanger 32 through a hole in the upper sheet 42 of insulating material. Blow-by gases within the crankcase of the engine are drawn through the crankcase vent tube 44 into one of the channels 36 and into the inlet air for the carburetor. The crankcase gases are then burnt in the engine cylinders. The tube 44 is constructed of metal, thereby allowing heat to be conducted into both ends. Heat is transferred to the tube 44 from the hot vent gases as they leave the crankcase and by contact between the heat exchanger 32 and the vent tube 44. Heating both ends of the crankcase vent tube 44 keeps the vented gases at a temperature above the dew point so that all of these gases will remain in vapor phase. Thus, water will not condense from these gases which water then can freeze when the ambient temperature drops below the freezing point of water.

Figure 4:
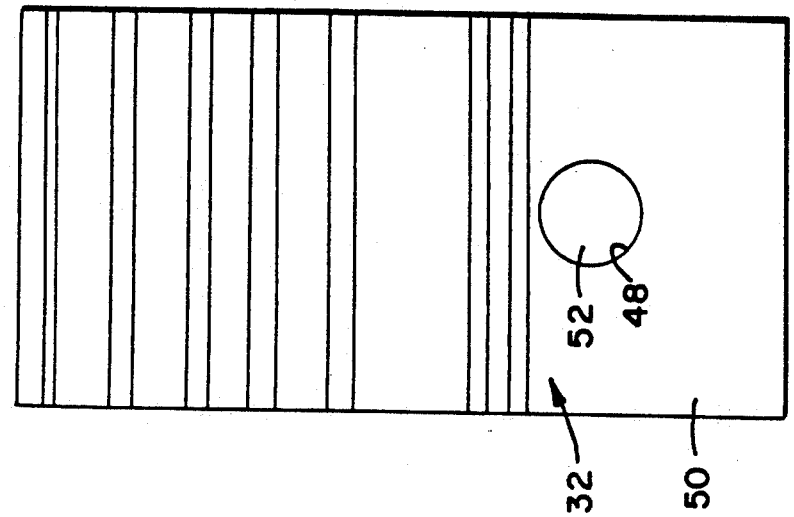
FIG. 4 is a side view of a heat exchanger in the carburetor air inlet heater.

A cavity 46 is formed in the bottom surface of the heat exchanber 32 in the orientation illustrated in FIG. 3. A circular aperture 48 extends sideways through the heat exchanger 34 from one section of the cavity 46 to the opposite side surface 50, as shown in FIG. 4. An electric resistance heater cartridge 52 has a cylindrical shape and is snugly fit within the aperture 48. The snug fit of the heater cartridge 52 provides good thermal conductivity between the cartridge and the heat exchanger 32. A pair of electrical leads 54 extend from the end of the heater cartridge 52 that is within the cavity 46 of the heat exchanger 32. One of these leads connects to a first thermostat 56 that is press fitted into a recess 58 in the heat exchanger 32 to achieve good thermal contact therebetween. The first thermostat 56 is located in the heat exchanger 32 in close proximity to the heater cartridge 52 and is electrically connected in series with that cartridge. The leads from the heater cartridge 52 and the first thermostat 56 which are not connected together are coupled to a cable 60 extending from the carburetor inlet heater. The first thermostat 56 is a safety switch which opens when the temperature of the heat exchanger 32 rises above 70 degrees Celsius, for example. This maintains the temperature of the heat exchanger below a point at which the skin of a user will blister if the heat exchanger is accidentally touched.

Figure 5:
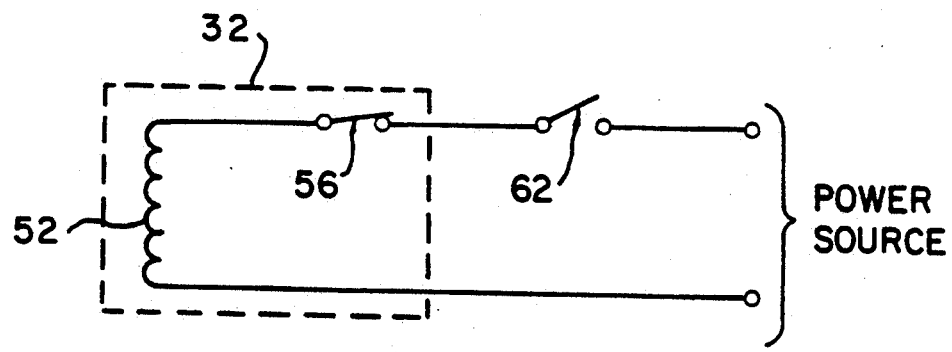
FIG. 5 is an electrical diagram of the circuit for controlling an electric heating device coupled to the heat exchanger.

A second thermostat 62 is mounted in the manifold 21 at the outlet of the carburetor 22. The second thermostat 62 is connected in series with the first thermostat 56 and the heater cartridge 52 to an electrical power source, as shown in FIG. 5. Depending upon the type of heater cartridge 52, the power source furnishes either alternating or direct current of the proper voltage. In the case of an engine-generator set 10, the heater may be powered either by the direct current used in the ignition system of the engine or by the alternating current produced from the generator 14. Power is applied by the source whenever the engine is operating. The second thermostat 62 closes when the temperature of the air-fuel mixture flowing through the manifold 21 drops below 16 degrees Celsius, for example. This action insures that the heater cartridge 52 is only turned on when temperatures are conducive to severe icing. In addition, the second thermostat 62 prevents adding heat when the ambient temperature is sufficiently high that additional heat from the heater 20 could boil gasoline out of the carburetor. It should be noted that the threshold temperatures for the two thermostats 56 and 62 may vary depending upon the characteristics of the heat exchanger and thermal connection of the thermostats and of the heater cartridge 52 used in a given application of the present invention.

Figure 6:
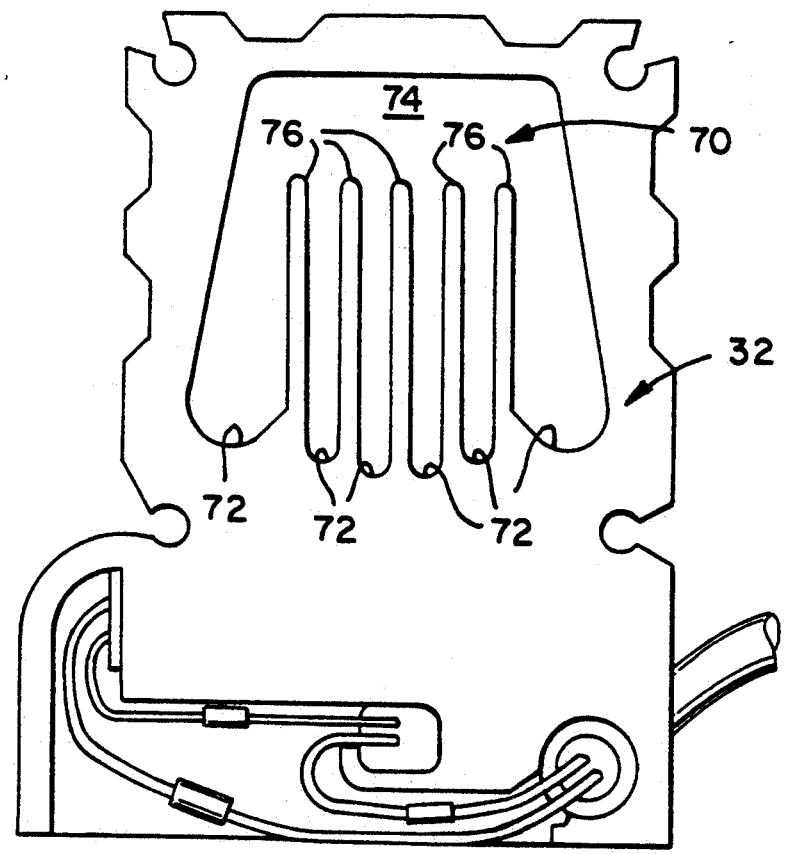
FIG. 6 is a plane view of the carburetor air inlet heater with a different type of heat exchanger.

FIG. 6 illustrates an alternative embodiment for the heat exchanger 32 in which the conduit 70 has a common channel 74 for air to pass from the air cleaner 16 to the carburetor 22. A number of peripheral channels 72 extend from a common channel 74 and are separated from one another by fins 76. The fins 76 aid in transferring heat from the heat exchanger 32 to the air flowing through the channels 72 and 74.

The carburetor inlet heater 20 utilizes conduction to carry heat from the heater cartridge 56 to the walls of the channels 36, fins 76, the carburetor body and the crankcase vent tube 44. Convection transfers heat from the heat exchanger 32 to the intake air flowing therethrough and then from the air to the carburetor body. This heat transfer insures that all of the surfaces of the carburetor that are exposed to moist intake air will be maintained above the freezing point of water. Similarly the crankcase vent tube 44 also is held above the freezing point. The inlet heater 20 is located to apply heat upstream of the carburetor. Thus the inlet air is raised in temperature which lowers its relative humidity before entering the carburetor. This prevents water vapor from condensing on surfaces of the carburetor and keeps those surfaces dry. As a result, even after the engine stops operating there is no water within the carburetor that can freeze and thereby lock the carburetor components in place.

The invention being claimed is:

1. A heater for a carburetor comprising:
   a heat exchanger fabricated of thermally conductive material with a plurality of channels therethrough;
   a mechanism for attaching the heat exchanger to an air inlet of the carburetor so that air entering the carburetor flows through the channels and so that heat can be conducted between said heat exchanger and the carburetor;
   a heating device attached to said heat exchanger; and
   a thermostat connected to activate said heating device when a sensed temperature is below a given level.

2. The heater for a carburetor as recited in claim 1 wherein said heat exchanger is fabricated from extruded aluminum.

3. The heater for a carburetor as recited in claim 1 wherein the plurality of channels in said heat exchanger are completely separated from one another.

4. The heater for a carburetor as recited in claim 1 wherein the plurality of channels in the heat exchanger include a common channel, and several peripheral channels which open into the common channel and which are separated from one another by a plurality of fins.

5. A heater for a carburetor comprising:
   a heat exchanger fabricated of thermally conductive material with two surfaces and a plurality of channels extending between the two surfaces;
   a mechanism for attaching the heat exchanger to an air inlet of the carburetor so that air entering the carburetor flows through the channels, and so that heat can be conducted between said heat exchanger and the carburetor;
   an electric heating device attached to said heat exchanger; and
   means for applying electricity to said heating device.

6. The heater for a carburetor as recited in claim 5 wherein the plurality of channels of said heat exchanger are completely separated from one another.

7. The heater for a carburetor as recited in claim 5 wherein the plurality of channels in the heat exchanger includes a common channel, and several peripheral channels opening into the common channel and separated from one another by a plurality of fins.

8. The heater for a carburetor as recited in claim 5 wherein said means for applying electricity comprises a thermostat in thermal contact with said heat exchanger and controlling electricity flowing to said electric heating device to prevent said heat exchanger from exceeding a given temperature.

9. The heater for a carburetor as recited in claim 5 wherein said means for applying electricity comprises a thermostat for sensing a temperature of an air-fuel mixture exiting from the carburetor and applying electricity to said electric heating device when the temperature is below a given level.

10. The heater for a carburetor as recited in claim 5 wherein one surface of said heat exchanger is attached to the carburetor, and further comprising a coupling attached to the other surface of said heat exchanger to establish a connection to an air cleaner.

11. The heater for a carburetor as recited in claim 5 further comprising thermal insulating material exteriorly attached to said heat exchanger.

12. The heater for a carburetor as recited in claim 5 wherein said heat exchanger includes an aperture extending from an external surface of said heat exchanger to at least one of the plurality of channels for connection of a crankcase vent tube to said heat exchanger.

13. In an internal combustion engine having a carburetor for mixing fuel with air entering through an inlet of the carburetor, the improvement comprising:
   a heat exchanger in thermal contact with the carburetor, and having a plurality of channels in communication with the inlet;
   an electric heating device attached to said heat exchanger;
   a first thermostat attached to said heat exchanger and electrically connected to turn off a flow of electricity to said electric heating device when a temperature of said heat exchanger exceeds a first value; and
   a second thermostat mounted on the engine and connected in series with said first thermostat and said electric heating device, said second thermostat being electrically conductive when a temperature sensed by the second thermostat is below a second value.

14. The internal combustion engine as recited in claim 13 wherein said heat exchanger includes a cavity in which said electric heating device and said first thermostat are located.

15. The internal combustion engine as recited in claim 14 wherein the cavity of said heat exchanger is at least partially filled with a potting compound to secure said electric heating device and said first thermostat in place.

* * * * *